May 21, 1935.  W. G. RICHARDSON  2,002,378

BIRD BATH

Filed May 17, 1934

Inventor.
Walter G. Richardson
by ... Greenwood atty.

UNITED STATES PATENT OFFICE 2,002,378

BIRD BATH

Walter G. Richardson, South Gardner, Mass.

Application May 17, 1934, Serial No. 726,042

5 Claims. (Cl. 119—1)

This invention relates to bird baths.

A bird bath is commonly placed on a lawn or on the grounds of a house not only for the humane purpose of providing water for the birds but also to invite birds to stay in the vicinity of the bath. It is a matter of common observation that the ordinary bird bath is used but infrequently by the birds and that there are many species of birds in a given locality that rarely ever use the bath.

It is an object of the present invention to provide a bird bath wherein the pool of water is surrounded by a mass of growing flowers or other vegetation, thereby to give the pool a natural setting that renders it attractive and inviting to the birds and especially the more timid birds.

A further object of the invention is the provision of a bird bath wherein the pool of water is surrounded by earth and vegetation that provides a natural landing field on which the bird can alight and approach the pool.

A further object of the invention is the provision of a bird bath having a relatively shallow central tray adapted to hold a pool of water and an annular channel of substantial width surrounding the tray and adapted to hold soil in which flowers or other vegetation can grow, the annular channel preferably being relatively deep, as by extending under the tray, so that there is ample room to accommodate the roots of the plants.

A yet further object of the invention is the provision of a combined bird bath and flower urn comprising a bowl having a shallow tray in the middle thereof adapted to hold a pool of water, and the space between the bowl and the tray adapted to receive soil in which vegetation can grow, the edge of the tray being slightly below the lip of the bowl so that water placed in and overflowing the tray can run into the soil and thereby supply water necessary to the vegetation.

A further object of the invention is a bird bath comprising a hollow pedestal and a bowl seated upon the top of the pedestal, together with a tray located in the bowl over the opening, the tray being adapted to receive a pool of water and the space between the tray and the bottom of the bowl being adapted to receive soil in which plants can grow, there being communicating passages from the bottom of the space between the tray and the bowl so that surplus water can drain out and run into the hollow pedestal and escape therefrom.

A further object of the invention is generally to improve the construction and appearance and enhance the use of bird baths and flower urns.

Figure 1:
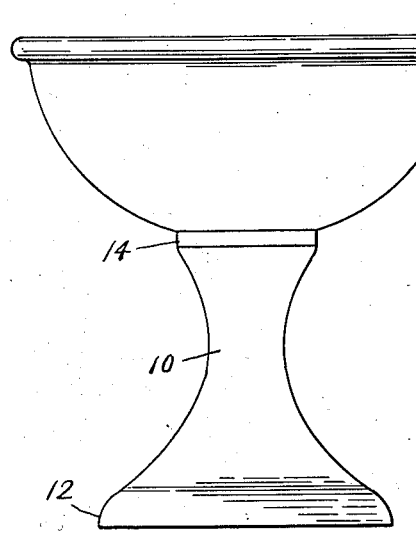
Fig. 1 is a front elevation of a bird bath embodying the present invention.
Figure 2:
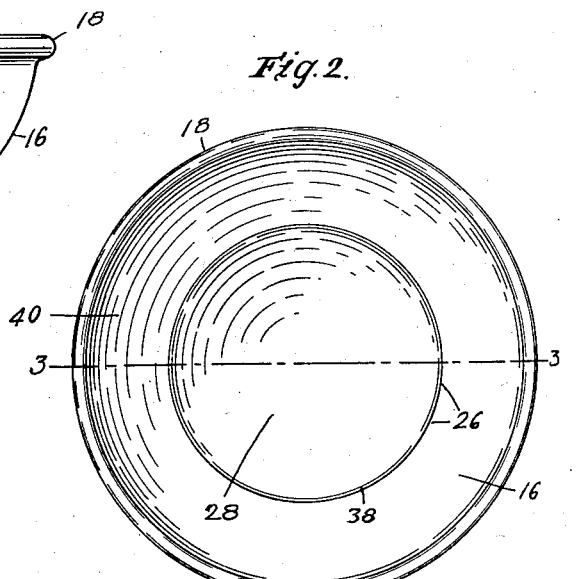
Fig. 2 is a plan view of the bird bath of Fig. 1.
Figure 3:
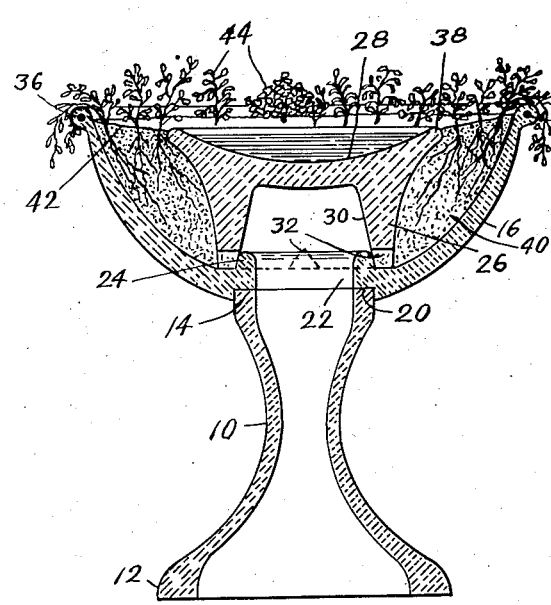
Fig. 3 is a sectional elevation taken along line 3—3 of Fig. 2.
Figure 4:
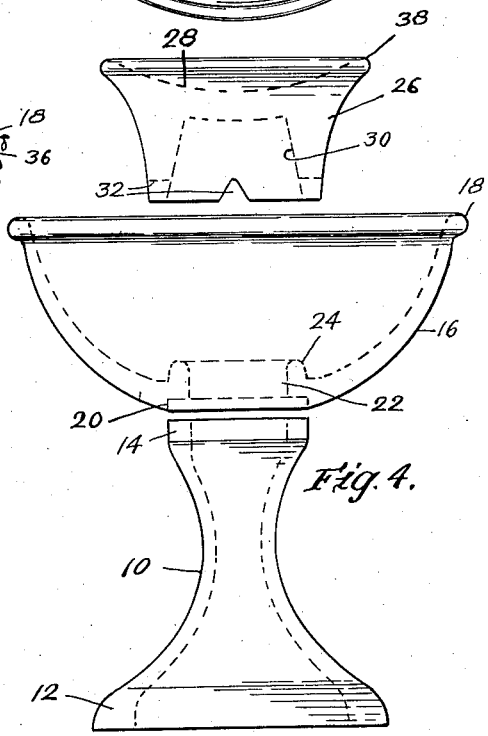
Fig. 4 is an elevation of the bird bath with the various parts thereof in separated condition.
Figure 5:
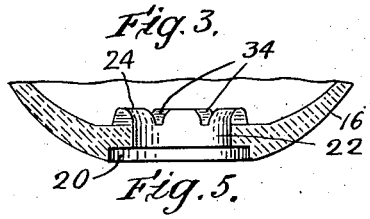
Fig. 5 is a sectional detail of the bottom of the bowl taken along line 3—3 of Fig. 2 and illustrating a modified construction for draining the bowl.

The bird bath embodying the present invention comprises a hollow pedestal 10 of suitable configuration, preferably of circular cross-section, having an enlarged base 12 and a smaller annular top 14. Both the top and the base are open so that there is a passage completely through the pedestal from one end to the other. The pedestal provides support for a bowl 16, preferably of semi-spherical configuration, having an enlarged bead or lip 18 at the top or edge of the bowl and having an inwardly directed annular recess 20 in the bottom in which the top 14 of the pedestal is adapted to be seated so that the bowl is supported by the pedestal and is retained thereon against lateral displacement. The bottom of the bowl is provided with an opening 22 therein registering with the opening in the top of the pedestal and of about the same diameter as the top opening. Said opening 22 is surrounded by an upstanding rim 24 located interiorly of the bowl. A tray 26 is located within the bowl 16. Said tray is generally circular in cross-section and flares upwardly and outwardly from the bottom toward the top thereof and at the top is provided with a shallow recess 28 that is adapted to receive the pool of water for the bird's bath. The tray 26 is provided with a recess 30 in its bottom portion in which the rim 24 of the bowl is closely received with the bottom of the tray seated upon the bottom of the bowl immediately surrounding the recess so that the tray is supported within the bowl against lateral displacement. The bottom edge of the tray is provided with a series of notches 32 which preferably extend upwardly above the top of the rim 24 or are otherwise arranged so that the space between the tray and the bowl can be drained into the opening 22 and thence into the interior of the pedestal. As an alternative construction, however, the bottom edge of the tray can be free from the notches 32 and drainage notches 34 can be formed in the rim 24, as illustrated in Fig. 5. All parts of the bath herein described, that is to say, the pedestal, the bowl and the tray can be made of any suitable material as, for instance, cement, artificial stone, or the like, and each of the separate parts can have a solid one-piece construction. The design is such that all parts can be formed in a simple manner and assembled without the use of cement, although cement can be used if desired to secure the parts together.

For some purposes, especially with a large diameter bowl 16, the side wall of which is relatively thin, the bowl can be reinforced by a metal band or hoop 36 molded or otherwise imbedded in the rim 18. The dimensions of the parts are such that the rim 38 of the tray, when the parts are assembled, is somewhat, but preferably not greatly, below the rim 18 of the bowl. Preferably the rim 38 of the tray is a substantial distance inwardly of the side wall of the bowl, say for instance, five or six inches. The annular space 40 between the tray and the bowl is adapted to be filled with soil up to the level of the lip 38 of the tray so that the top line 42 of the soil is about on the level of the tray. Thus the tray is entirely surrounded and imbedded within a ring of soil. Flowers or other vegetation 44 are adapted to be planted in the soil and thereby to surround the pool of water in the tray and provide an attractive and apparently natural setting for the pool. The vegetation and the surface of the soil also provide a natural landing field on which the bird can alight and approach the pool. The depth of the annular soil receiving ring 40 is relatively great and is increased by extending the ring under the rim of the tray so there is ample room to accommodate the growing roots of the plants. The soil is automatically watered by filling the tray to overflowing with water and the water will sink into the soil instead of running over the surface thereof and out of the bowl since the top of the tray is lower than the top of the bowl. Surplus water can drain from the soil at the bottom of the bowl and escape through the interior of the pedestal.

I claim:

1. A bird bath comprising a bowl and a shallow water-retaining bath tray within said bowl, said bowl and tray providing an annular soil receiving channel of substantial width between them in which vegetation may grow to surround the water in the tray, the top of the tray being somewhat below the top of the bowl, said bowl having a drainage passage for said channel opening through the bottom of said bowl under said tray.

2. A bird bath comprising a hollow pedestal opening at the top, a bowl seated upon said pedestal and having an opening through the bottom thereof communicating with the interior of said pedestal, and a tray member received within and supported on the bottom of said bowl and having a shallow bath tray at the top, said tray member and bowl being peripherally spaced and providing between them an annular channel of substantial radial width adapted to receive soil in which vegetation may be planted, said tray member having an outwardly flaring top which overlies the inner portion of said channel.

3. A bird bath comprising a bowl having an opening through the bottom wall thereof and an annular rim surrounding said opening within the interior of the bowl and upstanding above said bottom wall, and a tray member seated upon said bottom wall and having a recess in its bottom face in which said rim is received and by which rim said tray member is held against lateral displacement, said tray member having an outwardly flaring top portion that has a bath recess therein, said tray member and said bowl cooperating to provide an annular channel of substantial width that extends beneath said bath recess and is adapted to hold soil in which vegetation can grow, said rim and the bottom of said tray member being relatively notched to provide a drainage passage from the bottom of said channel to said bowl opening.

4. A bird bath comprising a bowl having an opening through the bottom wall thereof and an annular rim surrounding said opening within the interior of the bowl and upstanding above said bottom wall, a tray member seated upon said bottom wall and having a recess in its bottom face in which said rim is received and by which rim said tray member is held against lateral displacement, said tray member having an outwardly flaring top portion that has a bath recess therein, said tray member and said bowl cooperating to provide an annular channel of substantial width that extends beneath said bath recess and is adapted to hold soil in which vegetation can grow, said rim and the bottom of said tray member being relatively notched to provide a drainage passage from the bottom of said channel to said bowl opening, and a hollow pedestal open at the top on which said bowl is seated, the lower face of said bowl having an annular recess surrounding said bowl opening in which the top of said pedestal is received, and said bowl opening communicating with the interior of said pedestal.

5. A bird bath comprising a pedestal, a flower bowl seated on said pedestal and a shallow bath tray within the bowl, the bowl being deep and large in diameter and the tray being shallow and small in diameter, the tray having supports depending from its bottom which rest upon the bottom of the bowl and hold the top of the tray somewhat below the top of the bowl, the space between the tray and the bowl being wide and deep and underlying the tray so as to increase the effective depth thereof and adapted to contain soil to the level of the top of the tray and bowl.

WALTER G. RICHARDSON.